United States Patent
Song

(10) Patent No.: US 12,322,152 B2
(45) Date of Patent: Jun. 3, 2025

(54) METHOD AND APPARATUS FOR DETECTING BACKLIGHT OF IMAGE

(71) Applicant: HYUNDAI MOBIS CO., LTD., Seoul (KR)

(72) Inventor: Dong Hui Song, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 429 days.

(21) Appl. No.: 17/664,370

(22) Filed: May 20, 2022

(65) Prior Publication Data
US 2023/0281953 A1     Sep. 7, 2023

(30) Foreign Application Priority Data
Mar. 2, 2022 (KR) .................. 10-2022-0026939

(51) Int. Cl.
G06V 10/60 (2022.01)
G06V 10/25 (2022.01)
G06V 10/50 (2022.01)
G06V 10/00 (2022.01)

(52) U.S. Cl.
CPC ............ G06V 10/60 (2022.01); G06V 10/25 (2022.01); G06V 10/50 (2022.01)

(58) Field of Classification Search
None
See application file for complete search history.

(56) References Cited

U.S. PATENT DOCUMENTS

| | | | |
|---|---|---|---|
| 2009/0028460 A1* | 1/2009 | Jung | G09G 3/3426 382/274 |
| 2011/0221933 A1* | 9/2011 | Yuan | H04N 23/71 348/E9.053 |
| 2014/0063288 A1 | 3/2014 | Suh et al. | |
| 2014/0092147 A1* | 4/2014 | Kimura | G09G 3/3426 345/87 |

FOREIGN PATENT DOCUMENTS

| | | |
|---|---|---|
| JP | 2004-008545 | 3/2004 |
| JP | 2017-520147 | 7/2017 |
| KR | 2017-0031982 | 3/2017 |

OTHER PUBLICATIONS

Korean Office Action dated Mar. 28, 2024 issued in KR 10-2022-0026939.
Extended European Search Report dated Dec. 2, 2022 issued in EP 22178554.6.

* cited by examiner

*Primary Examiner* — Mark R Milia
(74) *Attorney, Agent, or Firm* — DLA PIPER LLP US

(57) ABSTRACT

An apparatus for detecting backlight of image, comprising: a processor configured to convert a pixel value for each of a plurality of image frames based on a first threshold, and block the pixel value into a plurality of block regions to generate a converted frame, generate brightness cumulative data based on the converted frame, determine a block region in which a block value is maximum in the brightness cumulative data as a backlight candidate block region, classify the block regions into first and second regions based on a position of the backlight candidate block region and calculate a backlight score using the sum of block values for the block region of the first region and the sum of block values for the block region of the second region, and determine the image as a backlight image when the backlight score based on a second threshold.

17 Claims, 5 Drawing Sheets

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 220 | 0 | 0 | 0 | 0 | 0 | 0 | 0 | 0 | 0 | 0 | 0 | 0 | 0 |
| 0 | 232 | 244 | 236 | 0 | 0 | 0 | 0 | 0 | 0 | 0 | 0 | 0 | 0 | 0 | 0 |
| 0 | 228 | 236 | 232 | 0 | 0 | 0 | 0 | 0 | 0 | 0 | 0 | 0 | 0 | 0 | 0 |
| 0 | 0 | 224 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 232 | 224 | 236 | 0 | 0 | |
| 0 | 0 | 0 | 0 | 0 | 0 | 0 | 0 | 0 | 0 | 220 | 0 | 220 | 0 | 0 | |
| 0 | 0 | 0 | 0 | 0 | 0 | 0 | 0 | 0 | 0 | 0 | 0 | 0 | 0 | 0 | |
| 0 | 0 | 0 | 0 | 0 | 0 | 0 | 0 | 0 | 0 | 0 | 0 | 0 | 0 | 0 | |

FIG. 2A

| | | | | | | | |
|---|---|---|---|---|---|---|---|
| 0 | 55 | 0 | 0 | 0 | 0 | 0 | 0 |
| 115 | 237 | 0 | 0 | 0 | 0 | 0 | 0 |
| 0 | 56 | 0 | 0 | 0 | 0 | 0 | 0 |
| 0 | 0 | 0 | 0 | 0 | 113 | 170 | 0 |
| 0 | 0 | 0 | 0 | 0 | 0 | 0 | 0 |

*FIG. 2B*

|     |     |     |     |     |     |     |     |
|-----|-----|-----|-----|-----|-----|-----|-----|
| 0   | 55  | 0   | 0   | 0   | 0   | 0   | 0   |
| 113 | 236 | 0   | 0   | 0   | 0   | 0   | 0   |
| 0   | 54  | 0   | 0   | 0   | 0   | 0   | 0   |
| 0   | 0   | 0   | 0   | 0   | 12  | 17  | 0   |
| 0   | 0   | 0   | 0   | 1   | 9   | 8   | 0   |

FIG. 3

METHOD AND APPARATUS FOR DETECTING BACKLIGHT OF IMAGE

CROSS-REFERENCE TO RELATED APPLICATIONS

This application claims priority to Patent Application No. 10-2022-0026939, filed on Mar. 2, 2022 in Korea, the entire contents of which are incorporated herein by reference.

TECHNICAL FIELD

The present disclosure relates to backlight detection, specifically, to a method and apparatus for detecting a backlight of an image generated by sunlight.

BACKGROUND

The statements in this section merely provide background information related to the present disclosure and do not necessarily constitute prior art.

In autonomous driving and an advanced driver assistance system (ADAS), a vehicle uses various sensors, for example, a camera, radar, lidar, and ultrasonic sensors, to recognize the surrounding environment and a traveling situation. Among them, an image captured using a camera may provide image information on the surrounding environment to the vehicle, such as human visual information.

With development of an autonomous driving technology, various image recognition systems for recognizing the surrounding environment using a camera are used in a vehicle. However, backlight may occur due to various light sources existing around the vehicle, and a backlight image taken under the backlight conditions is difficult to read properly because the brightness of some regions is distorted. In particular, due to backlight generated from strong sunlight, misrecognition or failure of recognition of the surrounding environment may occur in the image recognition system, which increases the risk of accidents in autonomous vehicles and decreases reliability of autonomous driving.

In order to solve the problem of the backlight image, many methods for detecting and correcting a backlight image from a picture or a moving picture have been proposed. However, since conventional methods are designed to uniformly determine whether or not a backlight is present without considering the type and intensity of the light source, correcting the backlight image even in the case of a weak backlight capable of image recognition may cause unnecessary image distortion or an inaccurate detection of the backlight.

SUMMARY

A method and apparatus for detecting a backlight of image according to one embodiment generates brightness cumulative data based on a plurality of frames for a preset time period of an image and calculates a backlight score based on the brightness cumulative data to detect a backlight image by sunlight among various light sources.

A method and apparatus for detecting a backlight of image according to one embodiment generates brightness cumulative data based on a plurality of frames for a preset time period of an image, and can determine severity of a backlight image based on the brightness cumulative data.

The problems to be solved by the present disclosure are not limited to the problems mentioned above, and other problems not mentioned will be clearly understood by those skilled in the art from the following description.

According to one embodiment of the present disclosure, there is provided an apparatus for detecting backlight of image, comprising: a memory configured to store one or more instructions; and a processor configured to execute the one or more instructions stored in the memory, wherein the processor converts a pixel value for each of a plurality of frames of the image for a preset time period based on a first threshold value, and blocks the pixel value into a plurality of block regions of the same size to generate a converted frame, generates brightness cumulative data based on the converted frame, determines a block region in which a block value of the block region is the maximum in the brightness cumulative data as a backlight candidate block region, classifies the plurality of block regions into a first region and a second region based on a position of the backlight candidate block region and calculates a backlight score of the image using the sum of block values for the block region of the first region and the sum of block values for the block region of the second region, and determines the image as a backlight image when the backlight score is equal to or more than a preset second threshold.

According to another embodiment of the present disclosure, there is provided a method for detecting backlight of an image, comprising: converting a pixel value for each of a plurality of frames of the image for a preset time period based on a first threshold value, and blocking the pixel value into a plurality of block regions of the same size to generate a converted frame; generating brightness cumulative data based on the converted frame; determining a block region in which a block value of the block region is the maximum in the brightness cumulative data as a backlight candidate block region; classifying the plurality of block regions into a first region and a second region based on a position of the backlight candidate block region and calculating a backlight score of the image using the sum of block values for the block region of the first region and the sum of block values for the block region of the second region, and determining the image as a backlight image when the backlight score is equal to or more than a preset second threshold.

According to the method and apparatus of one embodiment, the brightness cumulative data is generated based on the plurality of frames for the preset time period of the image, the backlight score is calculated based on the brightness cumulative data to detect the backlight image by sunlight among various light sources, and thus, it is possible to improve accuracy in backlight detection.

According to the method and apparatus of one embodiment, the severity of the backlight image is determined based on the brightness cumulative data, and thus, it is possible to determine the backlight situation in which image recognition is impossible according to the severity of the backlight, and thus, improve reliability of the image recognition system.

BRIEF DESCRIPTION OF THE DRAWINGS

FIGS. 2A and 2B are diagrams illustrating a process of generating a converted frame by the apparatus for detecting backlight of image according to one embodiment of the present disclosure.

FIG. 3 is a diagram illustrating a process of calculating a backlight score of an mage by the apparatus for detecting backlight of image according to one embodiment of the present disclosure.

DETAILED DESCRIPTION

Figure 1:
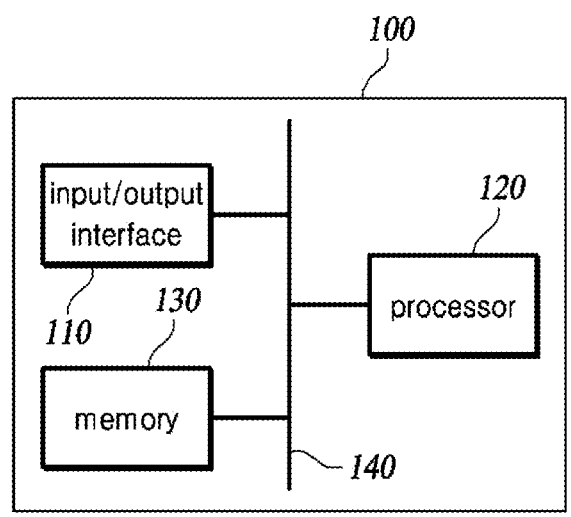
FIG. 1 is a diagram of an apparatus for detecting backlight of image according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The description of the present disclosure set forth below in conjunction with the accompanying drawings is intended to describe exemplary embodiments of the present disclosure, and is not intended to represent the only embodiments in which the present disclosure may be practiced.

FIG. 1 is a diagram of an apparatus for detecting backlight of image according to one embodiment of the present disclosure.

Referring to FIG. 1, an apparatus 100 for detecting backlight of image according to one embodiment includes an input/output interface 110, a processor 120, and a memory 130. Here, the input/output interface 110, the processor 120, and the memory 130 included in the apparatus 100 for detecting backlight of image according to one embodiment can mutually transmit data through a bus 140.

According to one embodiment, the apparatus 100 for detecting backlight of image may be mounted on a non-autonomous vehicle as a device for assisting traveling of a vehicle, and may be mounted on an autonomous vehicle for use in vehicle control.

The input/output interface 110 obtains data related to an image captured by a camera of a vehicle from the camera and provides the data to the processor 120. The data provided by the input/output interface 110 to the processor 120 may be a plurality of consecutive frames generated by the camera for each preset time period. Here, the plurality of consecutive frames may be frames for a preset time period among a plurality of frames constituting an image.

The frame of the image for the preset time period may be a frame generated during a time from a preset first time point to a second time point, but is not limited thereto, and may be determined based on the number of frames. For example, based on the preset number of frames according to a frame rate of the camera, the input/output interface 110 may provide the corresponding number of consecutive frames to the processor 120.

The processor 120 generates a converted frame based on a plurality of frames for a preset time period of an image. Here, the processor 120 generates the converted frame corresponding thereto for each frame. Accordingly, the processor 120 generates the same number of converted frames as the plurality of frames for the preset time period.

The processor 120 converts a pixel value of a frame based on a first threshold value. Here, the pixel value may be a pixel value indicating information on brightness among pixel values of a plurality of channels constituting a corresponding frame.

For example, when the frame is an RGB image, the pixel value may be an average value of pixel intensity in R channel, pixel intensity in G channel, and pixel intensity in B channel. When the frame is a Hue Saturation Value (HSV) image, the pixel value may be a pixel value of a V channel for a value of color, and when the frame is a YUV image, the pixel value may be a pixel value of a Y channel for luminance.

The first threshold value is a preset value with respect to the pixel value. The first threshold value is set to a relatively high value within a range of pixel values that one pixel can have in order to detect a light source of very strong brightness that can generate a backlight, for example, sunlight. For example, in the case of an RGB image, the first threshold value may be set to 220 in the pixel value range of 0 to 255.

The processor 120 converts a pixel value of a pixel having a pixel value less than the first threshold value among a plurality of pixels included in the frame to 0. Accordingly, a pixel having a pixel value equal to or more than the first threshold value is extracted.

After the processor 120 converts the pixel value of the frame, the processor 120 blocks the frame into a plurality of block regions having the same size to generate a converted frame. Here, the size of the block region is a preset size, for example, one block region is set to have a length corresponding to two pixels in a horizontal direction and two pixels in a vertical direction, and thus, one block region may be set for every four pixels in total.

The size of the block region may be set based on the size of the sun displayed on the frame. Since the sun is a subject located at a very large distance from the camera, the sun is captured in an almost constant size in the image captured by the camera. Specifically, the size of the photographed sun increases as a focal length of the lens increases, but is almost constant with changes in other photographing conditions. Accordingly, the size of the block region may be set based on the size of the region corresponding to the sun appearing on the frame, but is not limited thereto.

The block region has a block value corresponding to each block region. Here, the block value is an average pixel value for a plurality of pixels corresponding to the block region. The processor 120 calculates the block value based on pixel values for a plurality of pixels corresponding to the block region.

The processor 120 generates one brightness cumulative data based on a plurality of converted frames. Here, the brightness cumulative data is one two-dimensional array data generated based on a value obtained by accumulating block values for brightness of each block region in a plurality of converted frames during a preset time period for each block region.

The brightness cumulative data includes the same number and arrangement of block regions as the converted frame. The processor 120 generates the block value for each block region of the brightness cumulative data based on a plurality of converted frames for a preset time period.

The processor 120 sums the block values for the block regions of the same position corresponding to each of the plurality of converted frames for each block region. The processor 120 generates the block value for the block region at a corresponding position in the brightness cumulative data based on the summed value for each block region.

For example, when a first converted frame, a second converted frame, and a third converted frame are sequentially generated for a preset time period, the processor 120 sums a block value of a block region corresponding to a first position of the first converted frame, a block value of a block region corresponding to a first position of the second converted frame, and a block value of a block region corresponding to a first position of the third converted frame and generates a block value of a block region corresponding to a first position of the brightness cumulative data based on the sum.

The block value for the block region of the brightness cumulative data may be, but is not limited to, the sum of block values for the block regions at corresponding positions in the plurality of converted frames, and may be an average value of the block values. For example, the processor 120 may generate a value obtained by dividing the sum of the block values by the number of converted frames as the block value for the block region of the brightness cumulative data.

In the case of a light source of which a position changes during a preset time period, it appears as a large block value in a block region at a different position for each converted frame. Therefore, in the case of the light source of which the position changes with time, it is difficult to accumulate block values in the block region at the same position.

Meanwhile, in the case of a light source of which a position does not change during a preset time period, it repeatedly appears as a large block value in a block region at the same position or a neighboring position for each converted frame. Accordingly, the block values for the light sources of which the positions do not change are accumulated in the block region at the same position.

As a result, in the brightness cumulative data, a block region with a large block value relates to a light source of which the position does not change, and the block regions for a light source of which the position changes have a relatively small block value compared to the block region for the light source of which the position does not change as the block values are accumulated.

The backlight that interferes with image recognition of the vehicle during the daytime is mostly backlight caused by sunlight. In general, the sunlight is the only light source that does not change in motion in an image captured by a camera of a moving vehicle. Accordingly, when the light source that does not move is detected in the image, the sunlight can be detected from among various light sources existing on the road.

The processor 120 determines a block region having a maximum block value in the brightness cumulative data as a backlight candidate block region, and classifies the plurality of block regions of the brightness cumulative data into a first region and a second region based on a position of the backlight candidate block region.

The processor 120 determines the block region having the largest block value among the plurality of block regions in the brightness cumulative data as the backlight candidate block region, and sets the backlight candidate block region and the plurality of block regions adjacent thereto to the first region. For example, a total of nine block regions belonging to the range of three block regions in the horizontal direction and three block regions in the vertical direction with the backlight candidate block region as the center may be set as the first region, but the present disclosure is not limited thereto.

The processor 120 sets the remaining block regions other than the first region among the plurality of block regions in the brightness cumulative data as the second regions.

The processor 120 calculates a backlight score of the image by using the sum of the block values of the block region of the first region and the sum of the block values of the block region of the second region. Specifically, the backlight score of the image is calculated based on Equation 1.

$$\text{score} = 1 - \frac{\text{Light}_2}{\text{Light}_1} \quad \text{[Equation 1]}$$

Here, score is the backlight score of the image, $\text{Light}_1$ is the sum of the block values for a plurality of block regions included in the first region, and $\text{Light}_2$ is the sum of the block values for a plurality of block regions included in the second region.

As the difference in brightness between the first region and the second region increases, the value of the backlight score approaches 1. As the brightness difference between the first region and the second region increases, the probability of occurrence of the backlight increases. Therefore, as the value of the backlight score approaches 1, the likelihood of a backlight image increases.

The processor 120 determines that the image is the backlight image when the backlight score of the image is equal to or more than the preset second threshold value. Here, the second threshold value is a value set based on a case in which the difference in brightness between the first region and the second region is large enough to cause a backlight to occur in the image. The second threshold value may be set to a value between 0 and 1. For example, the second threshold value may be set to 0.7, but is not limited thereto.

When the image is determined as the backlight image, the processor 120 determines the severity of the backlight based on the sum of block values for the first region. Here, the severity of the backlight may be determined as any one of two or more preset severity levels according to the degree to which it affects an image recognition ability of the vehicle.

The processor 120 calculates the intensity of the backlight by using the sum of the block values for the block region of the first region. Specifically, the intensity of the backlight is calculated based on Equation 2.

$$\text{degree} = \frac{\text{Light}_1}{\text{Light}_{max}} \quad \text{[Equation 2]}$$

Here, degree is the intensity of the backlight. $\text{Light}_1$ is the sum of the block values for the block region of the first region, and $\text{Light}_{max}$ is the maximum value of the sum of the block values for the block region of the first region. The maximum value of the sum of the block values for the block region of the first region is calculated based on Equation 3.

$$\text{Light}_{max} = N \times \text{Block}_{max} \quad \text{[Equation 3]}$$

Here, N is the number of block regions corresponding to the first region among the block regions of the brightness cumulative data. $\text{Block}_{max}$ is the maximum block value that the block region of brightness cumulative data can have. For example, when the plurality of converted frames are generated based on an RGB image and the block value of the brightness cumulative data is the average value of block values of the plurality of converted frames, the maximum block value that the block region of the brightness cumulative data can have is 255.

The processor 120 determines to which level the intensity of the backlight belongs among the severity levels of two or more preset backlights.

For example, the preset severity level of the backlight may be set to a high level when the backlight intensity is 0.75 or more, a medium level when the backlight intensity is 0.3 or more and less than 0.75, and a low level when the backlight intensity is less than 0.3. The processor 120 may determine the severity of the backlight as any one of the high level, the medium level, and the low level based on the backlight intensity.

The memory 130 may include a volatile memory, a permanent memory, a virtual memory, or other types of memory for storing information used by or output by the apparatus 100 for detecting backlight of image. For example, the memory 130 may include a random access memory (RAM) or a dynamic RAM (DRAM).

The memory 130 may store a program for processing or control of the processor 120 and various data for the operation of the apparatus 100 for detecting backlight of image. For example, at least one or more of a plurality of frames for a preset time period of an image captured by the camera, a plurality of converted frames and brightness cumulative data generated by the processor 120, and information on backlight severity of an image may be included in the memory 130. In addition, the memory 130 may store setting information such as a first threshold value, a second threshold value, or two or more preset backlight severity levels.

Figure 2B:
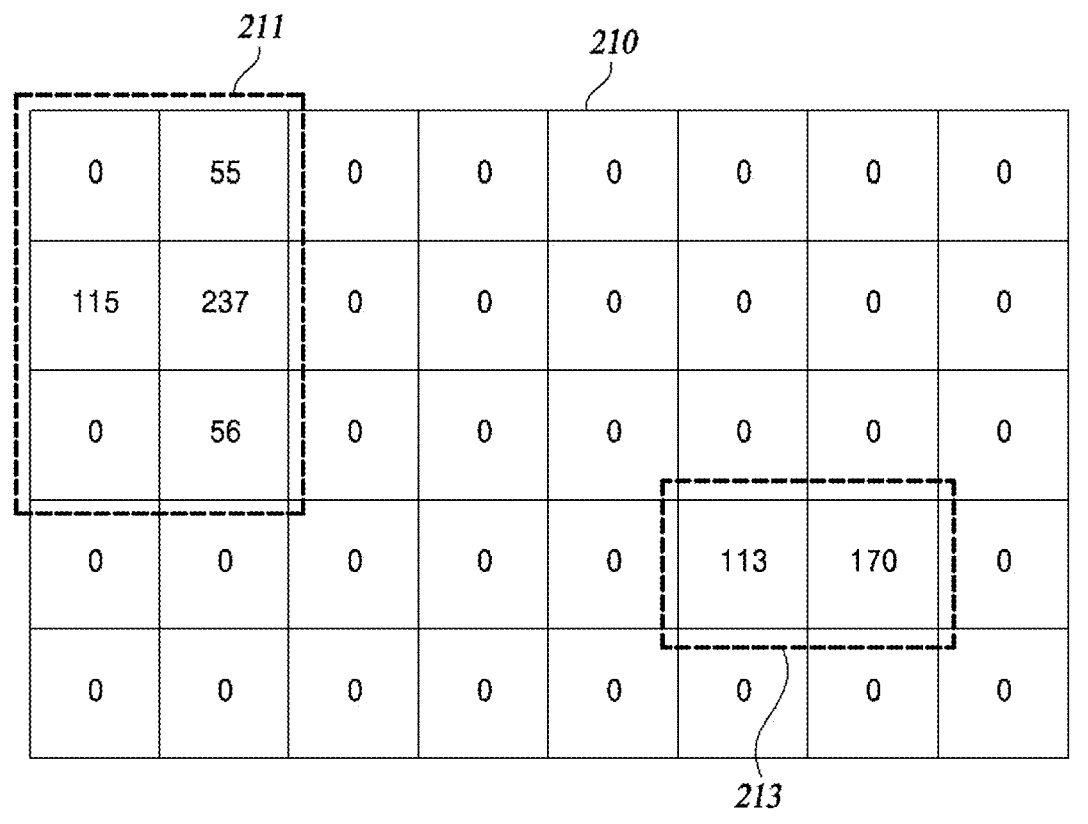

FIGS. 2A and 2B are diagrams illustrating a process of generating a converted frame by the apparatus for detecting backlight of image according to one embodiment of the present disclosure.

FIG. 2A is a diagram illustrating a frame 200 in which the apparatus for detecting backlight of image converts the pixel value based on the first threshold value, and FIG. 2B is a diagram illustrating a converted frame 210 generated by blocking the frame 200 of FIG. 2A into a plurality of block regions.

Referring to FIG. 2A, all pixel values of pixels having the pixel value less than 220, which is the first threshold value, among the plurality of pixels included in a frame 200 are converted to zero. Accordingly, a pixel having a pixel value of 220 or more is extracted.

Pixels corresponding to regions showing strong brightness on the frame of the image, for example, regions in which light sources such as the sun or lamp lighting of other vehicles, are photographed, are extracted, and the pixel values of pixels corresponding to the other regions are converted to 0. Accordingly, a solar pixel 201 and lamp lighting pixels 203 of other vehicles are extracted.

Referring to FIGS. 2A and 2B together, the apparatus for detecting backlight of image blocks the pixels of the frame 200 into a square block including 4 pixels, and blocks every 4 pixels. The converted frame 210 includes one block region for each position corresponding to two pixels in the horizontal direction and the vertical direction, resulting in a total of four pixels. Here, the block value for one block region is an average value of pixel values for four pixels corresponding to the block region.

The solar pixel 201 of the frame 200 and the lamp lighting pixel 203 of another vehicle are blocked in the solar block region 211 and the lamp lighting block region 213 of another vehicle at the corresponding position of the converted frame 210.

The apparatus for detecting backlight of image generates one converted frame 210 corresponding to each frame 200. Since pixel values of pixels of a plurality of frames constituting an image may be different for each frame, the plurality of converted frames may have a different arrangement of block values for each converted frame.

Figure 3:
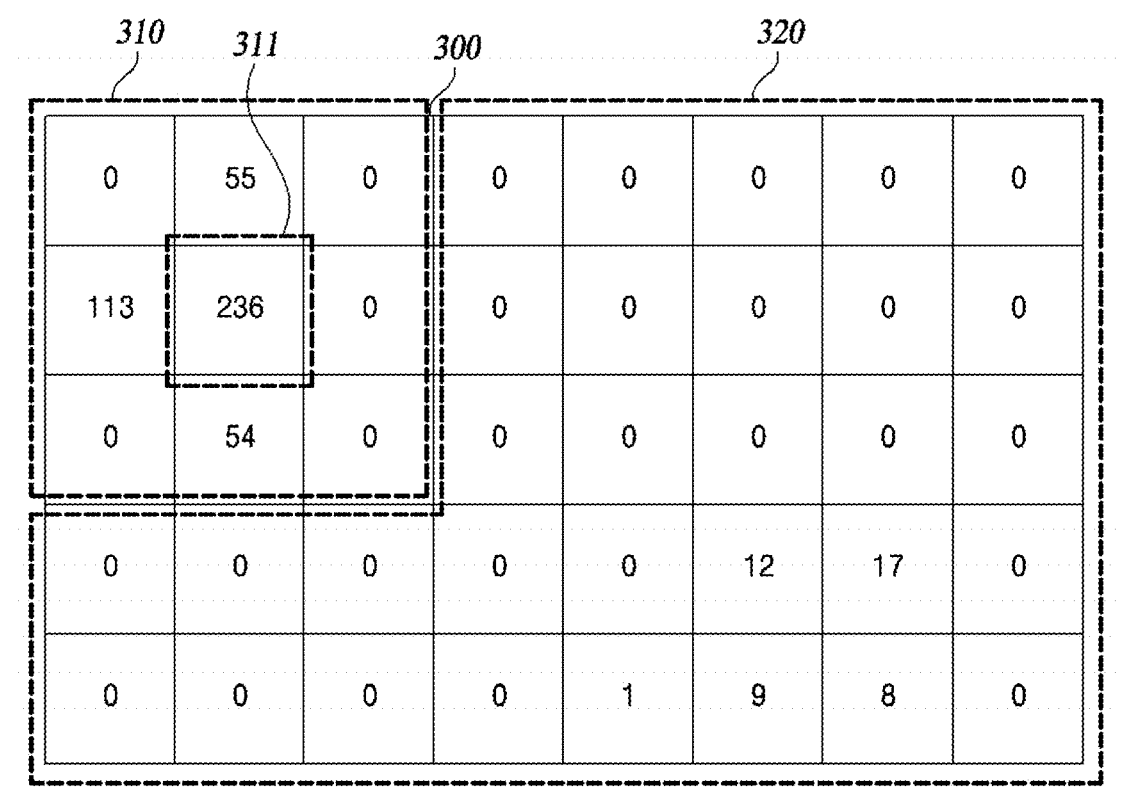

FIG. 3 is a diagram illustrating a process of calculating a backlight score of an image by the apparatus for detecting backlight of image according to one embodiment of the present disclosure.

Referring to FIG. 3, the apparatus for detecting backlight of image generates brightness cumulative data 300 based on the plurality of converted frames. Here, the brightness cumulative data 300 includes the same number and arrangement of block regions as the converted frames.

The block value for each block region of the brightness cumulative data 300 is an average value of the block values for the block regions at the same location corresponding to each of converted frames. Here, a block region with a large block value is a block region for a light source of which a position does not change, and a block region with a relatively small block value is a block region for a light source of which a position is changed.

The apparatus for detecting backlight of image determines the block region having the maximum block value as the backlight candidate block region 311, and sets the backlight candidate block region 311 and eight block regions adjacent to the backlight candidate block region 311 as the first region. The apparatus for detecting backlight of image sets the remaining block regions other than the first region 310 as the second region 320.

The apparatus for detecting backlight of image calculates the backlight score of the image using the sum of nine block values for the first region and the sum of 31 block values for the second region.

Figure 4:
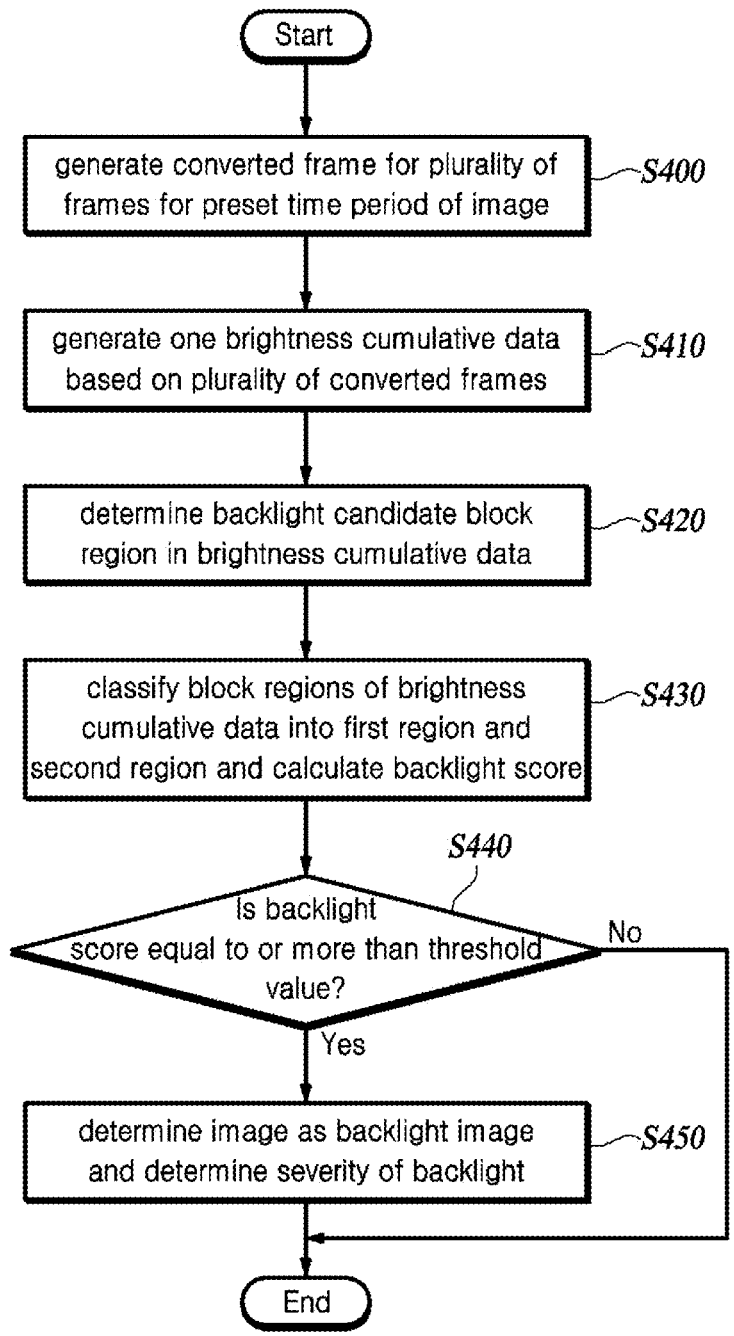
FIG. 4 is a flowchart illustrating a method for detecting backlight of image according to one embodiment of the present disclosure.

FIG. 4 is a flowchart illustrating a method for detecting backlight of image according to one embodiment of the present disclosure.

Referring to FIG. 4, the apparatus for detecting backlight of image generates the converted frame for the plurality of frames for the preset time period of the image (S400). Here, the apparatus for detecting backlight of image generates a corresponding converted frame for each frame.

The apparatus for detecting backlight of image converts the pixel value of the frame based on the preset first threshold value. Here, the first threshold value is a preset value with respect to the pixel value. Here, the first threshold value is set to a relatively high value within the range of the pixel values that one pixel can have in order to detect the light source of strong brightness capable of generating the backlight. The apparatus for detecting backlight of image converts the pixel value of the pixel having the pixel value less than the first threshold value to 0.

The apparatus for detecting backlight of image generates the converted frame by converting the pixel value of the frame and then blocking the frame into the plurality of block regions having the same size. The block region has the block value corresponding to each block region. Here, the block value is the average value of the pixel values for the plurality of pixels corresponding to the block region.

The apparatus for detecting backlight of image generates one brightness cumulative data based on the plurality of converted frames (S410). Here, the brightness cumulative data is one two-dimensional array data generated based on a value obtained by accumulating block values for the brightness of each block region in the plurality of converted frames during a preset time period for each block region. The brightness cumulative data includes the same number and arrangement of block regions as the converted frame.

The apparatus for detecting backlight of image sums up the block values for the block regions of the same position corresponding to each of a plurality of converted frames for each block region, and based on the summed values for each block region, generates the block value for the block region at the corresponding position in the brightness cumulative data.

The block value for the block region of the brightness cumulative data may be, but is not limited to, the sum of the block values for the block regions at the corresponding positions in the plurality of converted frames, and may be the average value of the block values.

The apparatus for detecting backlight of image determines the backlight candidate block region from the brightness cumulative data (S420). Here, the backlight candidate block region is determined as the block region having the maximum block value among the plurality of block regions of the brightness cumulative data.

The apparatus for detecting backlight of image classifies the plurality of block regions of brightness cumulative data into the first region and the second region and calculates the backlight score (S430).

The apparatus for detecting backlight of image sets the backlight candidate block region and the plurality of block regions adjacent thereto among the plurality of block regions of brightness cumulative data as the first region, and sets the remaining block regions other than the first region as the second region.

The apparatus for detecting backlight of image calculates the backlight score of the image using the sum of block values for the block region of the first region and the sum of block values for the block region of the second region. As the brightness difference between the first region and the second region increases, the backlight score increases, and as the value of the backlight score increases, the likelihood of the backlight image increases.

The apparatus for detecting backlight of image determines whether the backlight score is equal to or more than the preset threshold value (S440). Here, the threshold value may be a second threshold value set based on the case in which the difference in brightness between the first region and the second region is large enough to generate the backlight in the image.

When the backlight score is equal to or more than the second threshold value, the apparatus for detecting backlight of image determines the image as the backlight image and determines the severity of the backlight (S450).

The apparatus for detecting backlight of image calculates the intensity of the backlight based on the sum of the block values for the block regions of the first region, and determines whether the intensity of the backlight belongs to any of two or more preset severity levels of the backlight.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An apparatus for detecting backlight of image, comprising:
 a memory configured to store one or more instructions; and
 a processor configured to execute the one or more instructions stored in the memory,
 wherein the processor:
  obtains a pixel value for pixels constituting each frame of a plurality of image frames that are sequentially generated for a preset time period,
  converts the pixel value to 0 if the pixel value is less than a first threshold value, blocks the frame into a plurality of block regions of a same size to generate a converted frame, wherein the size of the block region is determined based on a size of a sun displayed on the frame, generates brightness cumulative data based on the converted frame, determines, as a backlight candidate block region, a block region in which a block value of the block region is a maximum in the brightness cumulative data, classifies the plurality of block regions into first and second regions based on a position of the backlight candidate block region and calculates a backlight score of the image using a sum of block values for the block region of the first region and a sum of block values for the block region of the second region, and determines that the image is a backlight image based on the backlight score and a second threshold, wherein the first threshold value is set to a value for detecting a sunlight.

2. The apparatus of claim 1, wherein the processor determines severity of the backlight based on the sum of block values for the block region of the first region when the image is determined to be the backlight image.

3. The apparatus of claim 2, wherein the processor calculates intensity of the backlight based on the sum of block values for the block regions of the first region, and determines which level the image belongs to among two or more preset severity levels based on the intensity of the backlight.

4. The apparatus of claim 1, wherein the pixel value is a pixel value related to brightness among pixel values related to a plurality of channels of the frame.

5. The apparatus of claim 1, wherein the processor divides the frame into a plurality of block regions having a preset size and calculates a block value of each block region, and
the block value is an average value of pixel values for pixels corresponding to the block region.

6. The apparatus of claim 1, wherein the bright cumulative data has a same number of block regions as a number of the block regions of the converted frame, and
the block value of the block region of the brightness cumulative data is a value generated by summing block values for block regions at a same position corresponding to a position of the block region of the brightness cumulative data in the converted frame for each block region.

7. The apparatus of claim 1, wherein the first region comprises the backlight candidate block region and a plurality of block regions at a position adjacent to the backlight candidate block region among a plurality of block regions included in the brightness cumulative data, and
the second region includes remaining block regions included in the brightness cumulative data.

8. The apparatus of claim 1, wherein the backlight score of the image is calculated based on a relative ratio between the sum of block values for the block region of the first region and the sum of block values for the block region of the second region.

9. The apparatus of claim 1, wherein the processor calculates a sum of a block value of the block region of the first region in each of the plurality of image frames to obtain the sum of block values for the block region of the first region, and calculates a sum of block value of the block region of the second region in each of the plurality of image frames to obtain the sum of block values for the block region of the second region.

10. A method of detecting backlight of an image, comprising:
obtaining a pixel value for pixels constituting each frame of a plurality of image frames that are sequentially generated for a preset time period;
converting the pixel value to 0 if the pixel value is less than a first threshold value;
blocking the frame into a plurality of block regions of a same size to generate a converted frame, wherein the size of the block region is determined based on a size of a sun displayed on the frame;
generating brightness cumulative data based on the converted frame;
determining, as a backlight candidate block region, a block region in which a block value of the block region is a maximum in the brightness cumulative data;
classifying the plurality of block regions into first and second regions based on a position of the backlight candidate block region and calculating a backlight score of the image using a sum of block values for the block region of the first region and a sum of block values for the block region of the second region, and
determining that the image is a backlight image based on the backlight score and a second threshold,
wherein the first threshold value is set to a value for detecting a sunlight.

11. The method of claim 10, further comprising determining severity of the backlight based on the sum of block values for the block region of the first region when the image is determined to be the backlight image.

12. The method of claim 11, wherein determining the severity of the backlight includes calculating intensity of the backlight based on the sum of block values for the block regions of the first region and determining which level the image belongs to among two or more preset severity levels based on the intensity of the backlight.

13. The method of claim 10, wherein the pixel value is a pixel value related to brightness among pixel values related to a plurality of channels of the frame.

14. The method of claim 10, wherein generating the converted frame comprises dividing the frame into a plurality of block regions having a preset size and calculating a block value of each block region, and
the block value is an average value of pixel values for pixels corresponding to the block region.

15. The method of claim 10, wherein the bright cumulative data has a same number of block regions as number of the block regions of the converted frame, and
the block value of the block region of the brightness cumulative data is a value generated by summing block values for block regions at a same position corresponding to a position of the block region of the brightness cumulative data in the converted frame for each block region.

16. The method of claim 10, wherein the first region comprises the backlight candidate block region and a plurality of block regions at a position adjacent to the backlight candidate block region among a plurality of block regions included in the brightness cumulative data, and
the second region includes remaining block regions included in the brightness cumulative data.

17. The method of claim 10, wherein the backlight score of the image is calculated based on a relative ratio between the sum of block values for the block region of the first region and the sum of block values for the block region of the second region.

* * * * *